(No Model.) 9 Sheets—Sheet 1.

W. P. HOSKINS.
SHIP'S BERTH.

No. 544,979. Patented Aug. 20, 1895.

WITNESSES
Henry C. Kerreth
Arthur T. Sadler

INVENTOR
William Parish Hoskins.
by Connolly Bros Attys (No Model.) 9 Sheets—Sheet 3.

W. P. HOSKINS.
SHIP'S BERTH.

No. 544,979. Patented Aug. 20, 1895.

WITNESSES
INVENTOR

William Parish Hoskins
by Connolly Bros Attys (No Model.)  W. P. HOSKINS.  9 Sheets—Sheet 4.
SHIP'S BERTH.

No. 544,979.  Patented Aug. 20, 1895.

WITNESSES  INVENTOR

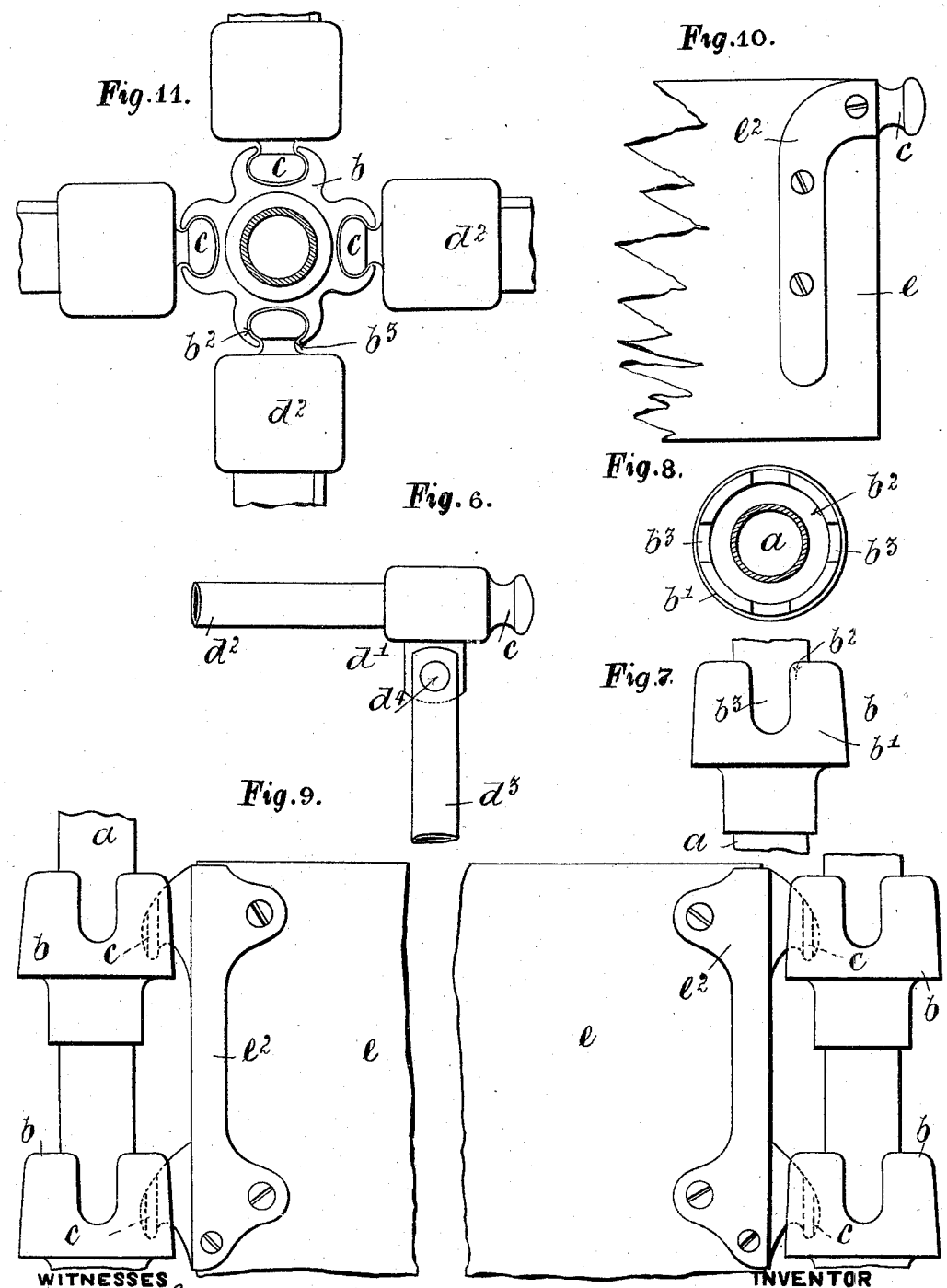

(No Model.) 9 Sheets—Sheet 6.

W. P. HOSKINS.
SHIP'S BERTH.

No. 544,979. Patented Aug. 20, 1895.

WITNESSES
Henry Okerrett
Arthur T. Sadler

INVENTOR
William Parish Hoskins
by Connolly Bros Attys

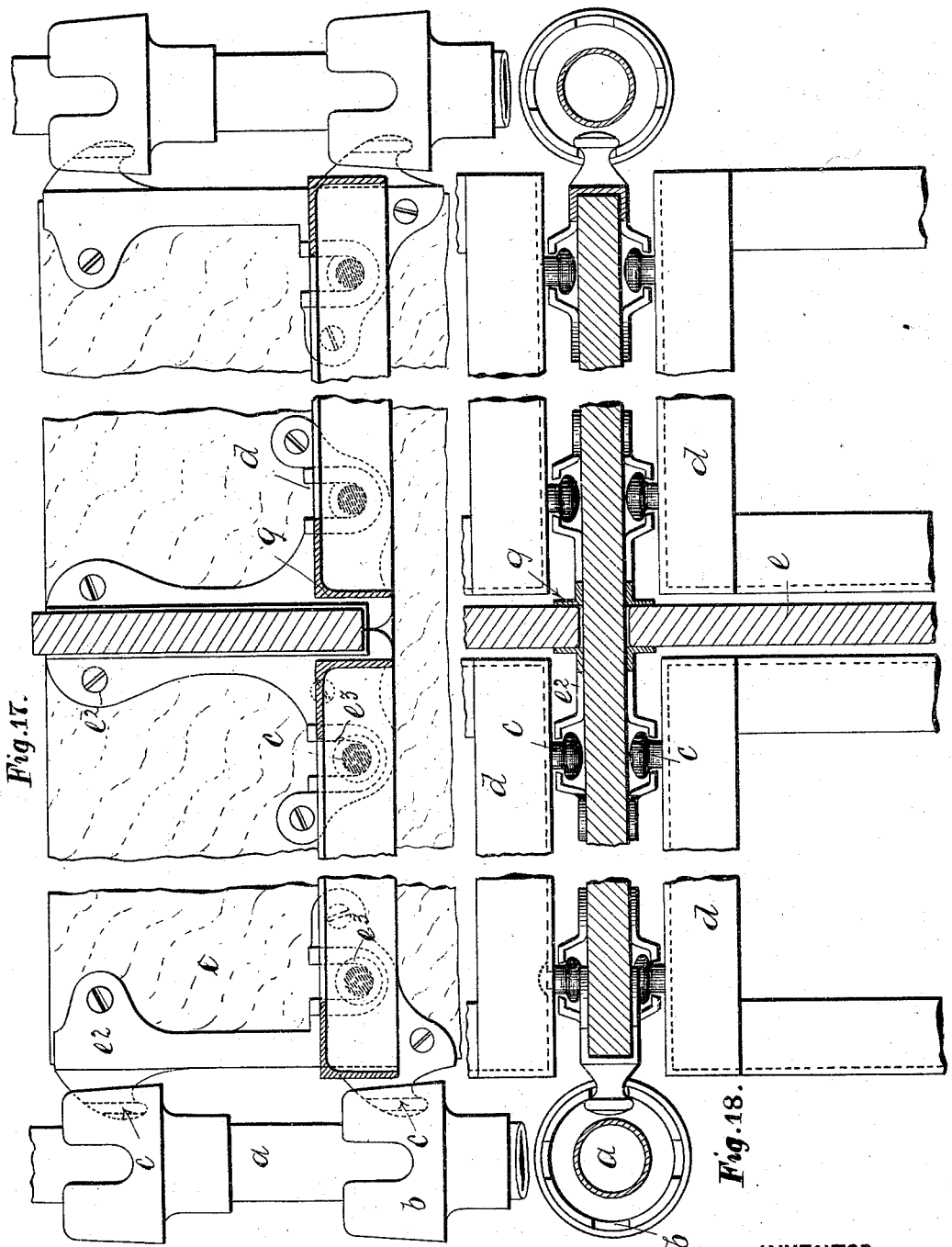

(No Model.)  9 Sheets—Sheet 8.

W. P. HOSKINS.
SHIP'S BERTH.

No. 544,979. Patented Aug. 20, 1895.

WITNESSES
Henry Skerrett
Arthur T. Sadler

INVENTOR
William Parish Hoskins
by Connolly Bros Atty (No Model.) 9 Sheets—Sheet 9.
W. P. HOSKINS.
SHIP'S BERTH.

No. 544,979. Patented Aug. 20, 1895.

WITNESSES
Henry Skerrett
Arthur J. Sadler

INVENTOR
William Parish Hoskins
By Connolly Bros Attys

UNITED STATES PATENT OFFICE.

WILLIAM PARISH HOSKINS, OF BIRMINGHAM, ENGLAND.

SHIP'S BERTH.

SPECIFICATION forming part of Letters Patent No. 544,979, dated August 20, 1895.

Application filed December 6, 1892. Serial No. 454,296. (No model.) Patented in England October 19, 1886, No. 13,304, June 14, 1890, No. 9,207, and October 6, 1892, No. 17,801.

*To all whom it may concern:*

Be it known that I, WILLIAM PARISH HOSKINS, berth manufacturer, a subject of the Queen of Great Britain, residing at Upper Trinity Street, Bordesley, in the city of Birmingham, England, have invented certain new and useful Improvements in the Between-Deck Fittings of Ships; and I do hereby declare the following to be a full, clear, and exact description of the invention, reference being had to the accompanying drawings, which form part of this specification, and for which invention Letters Patent of Great Britain have been granted, bearing date October 19, 1886, No. 13,304, June 14, 1890, No. 9,207, and October 6, 1892, No. 17,801.

This invention relates to between-deck accommodation or fittings of ships, comprehending berths and portable parting fittings.

This invention consists in the novel construction, combination, and arrangement of parts, as hereinafter described and claimed.

Figure 1:
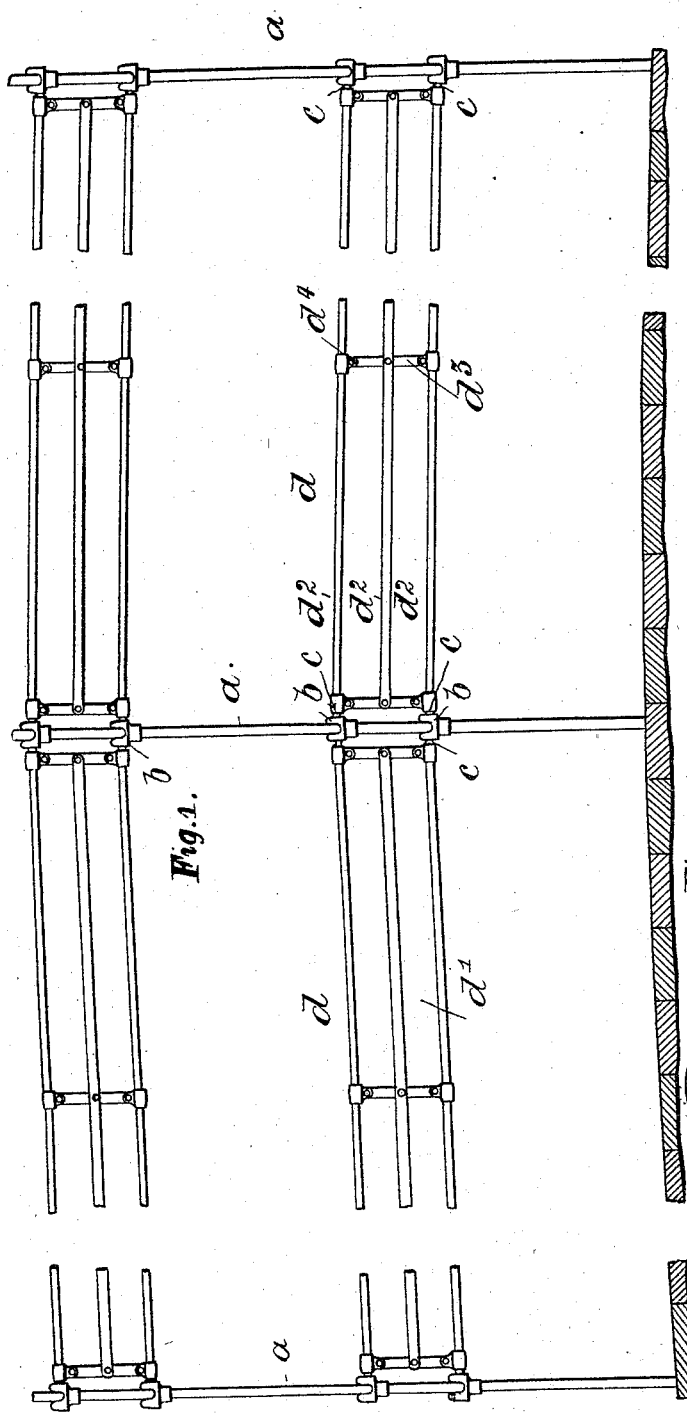
Figure 2:
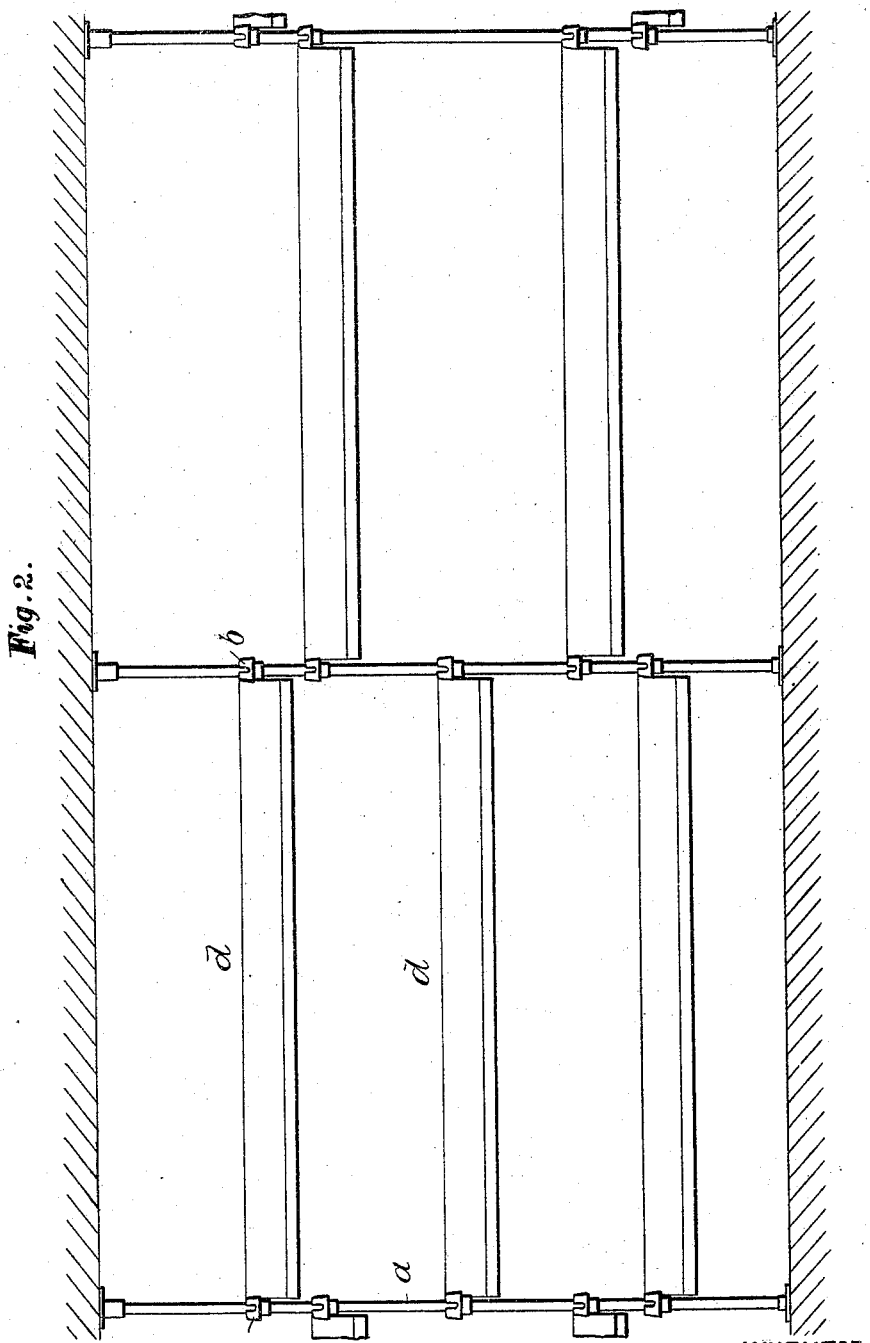
Figure 3:
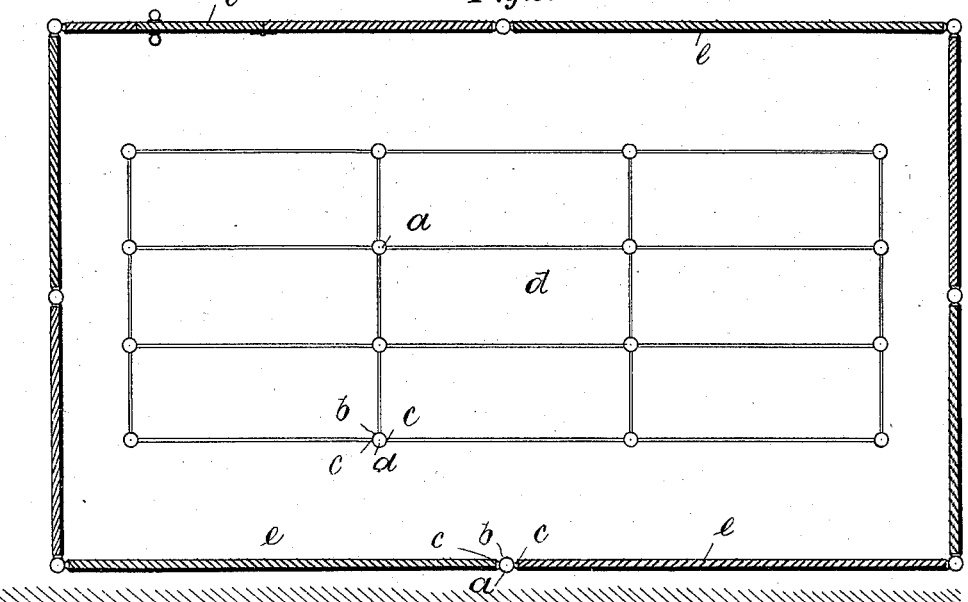
Figure 4:
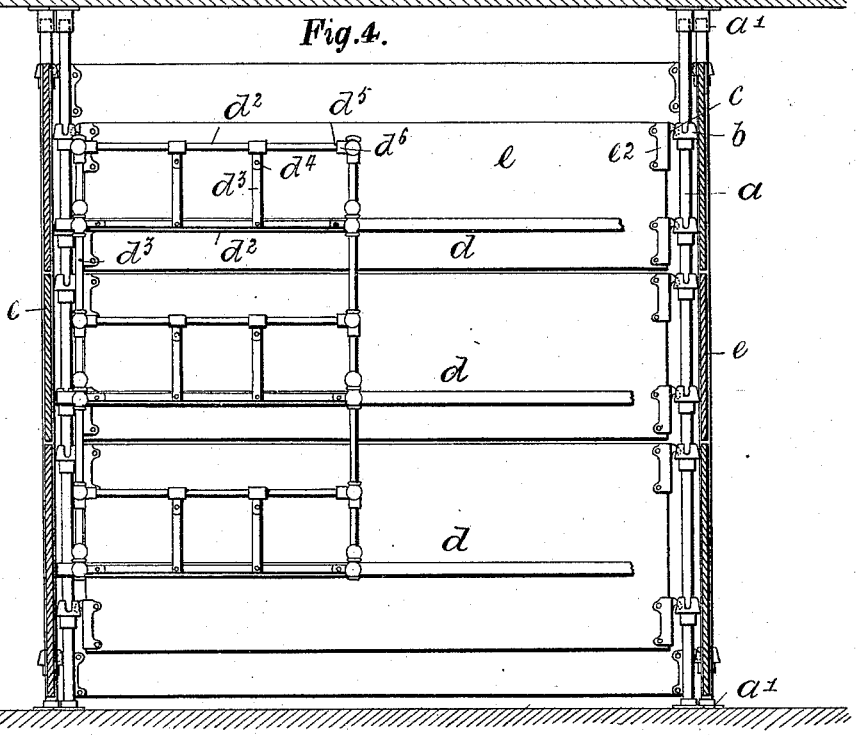
Figure 5:
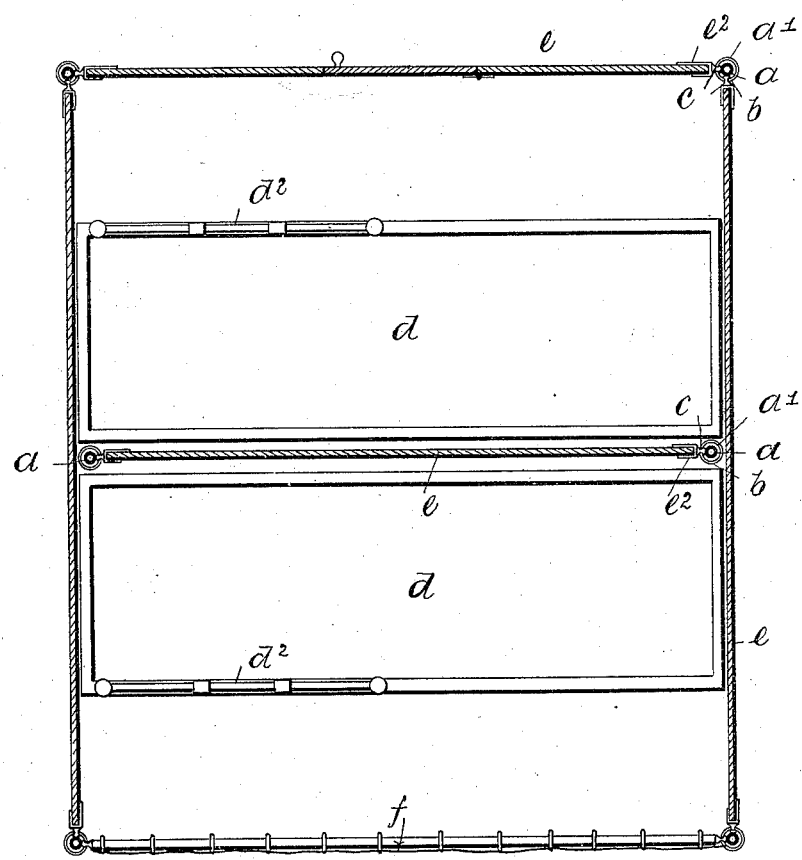
Figure 15:
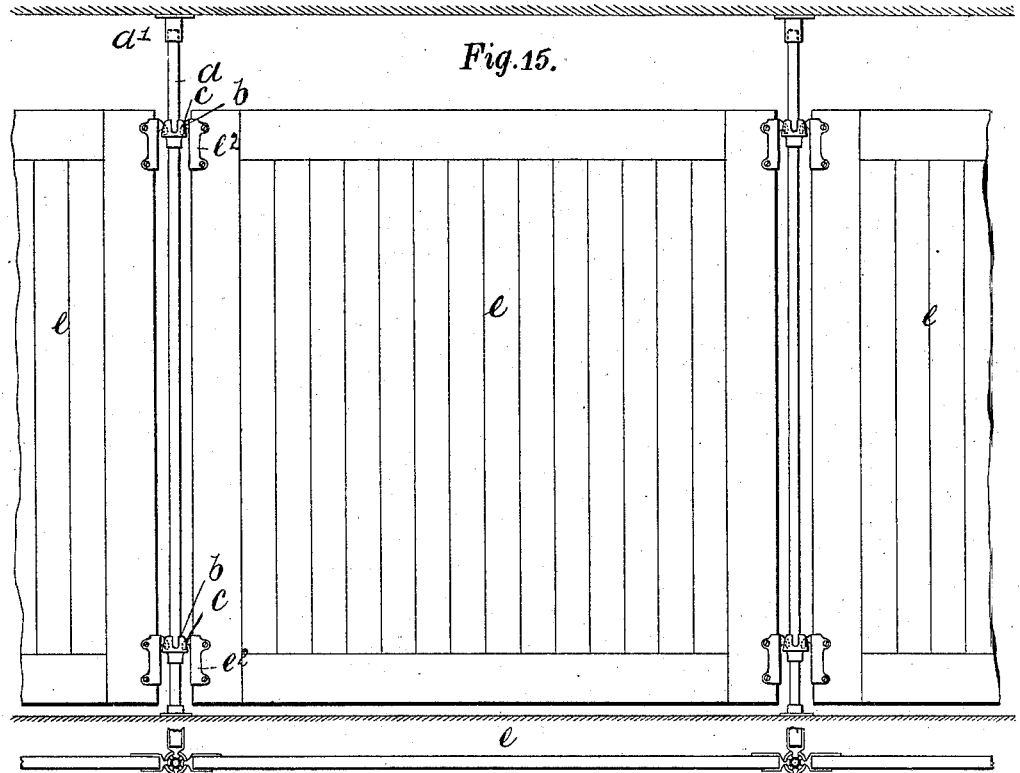
Figure 16:
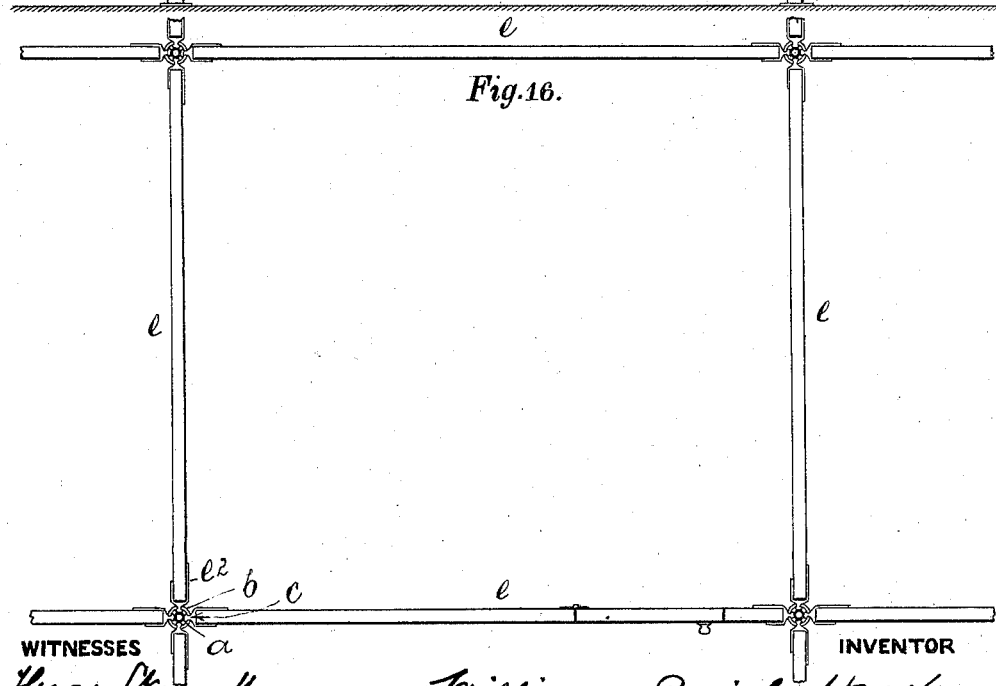
Figure 19:
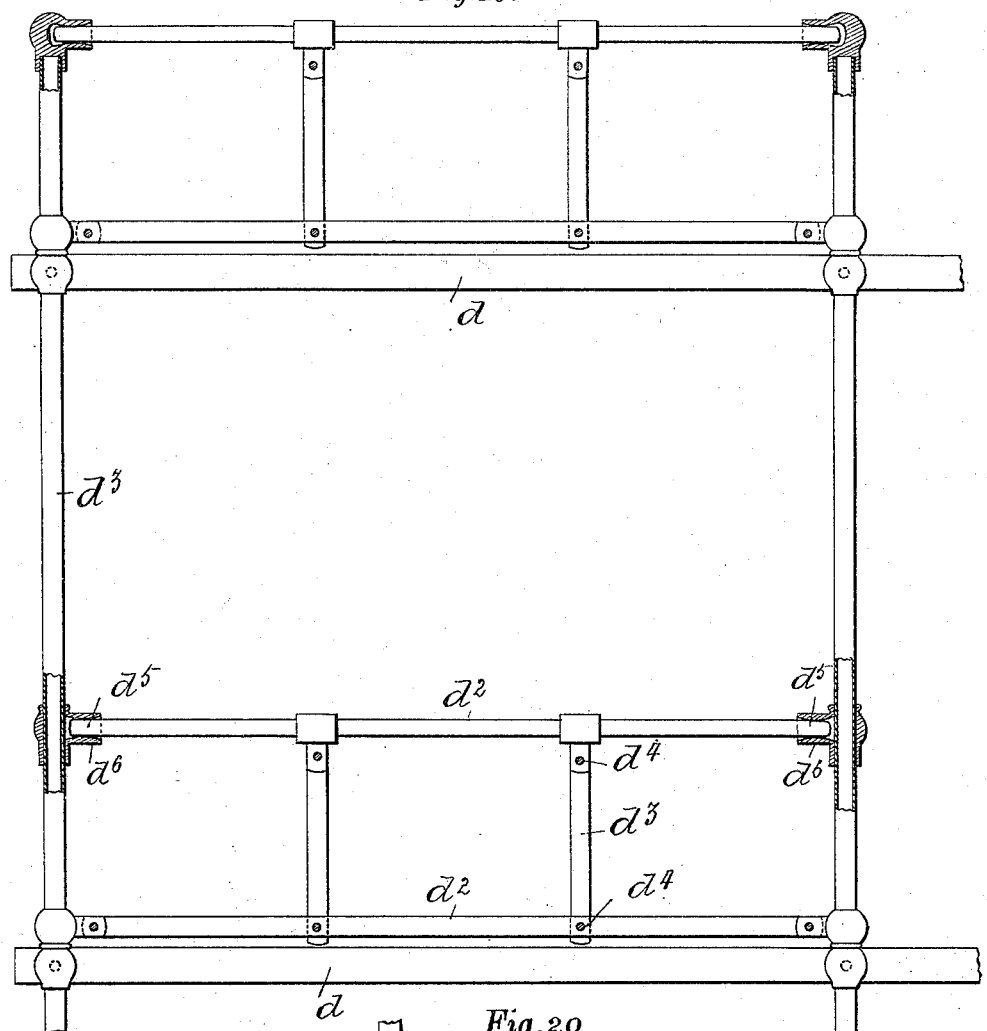
Figure 20:
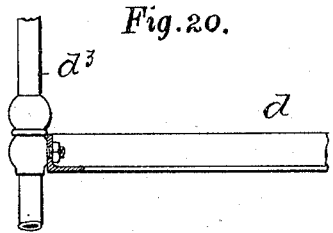
Figure 21:
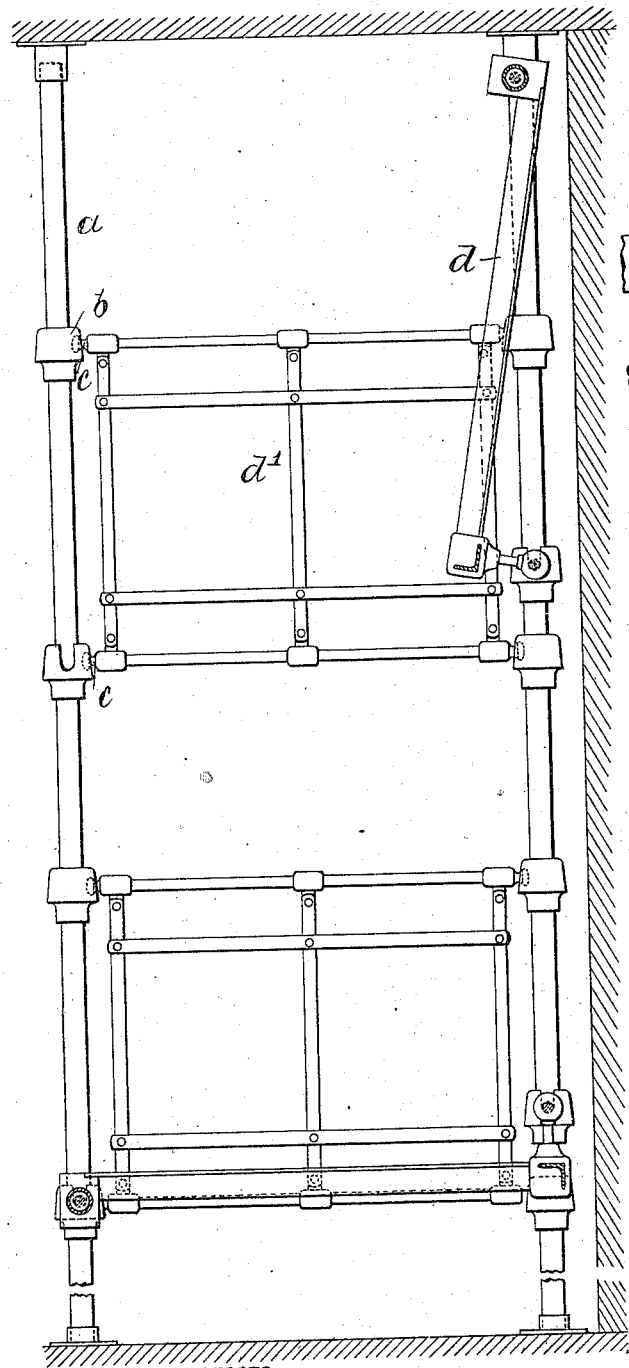
Figure 23:
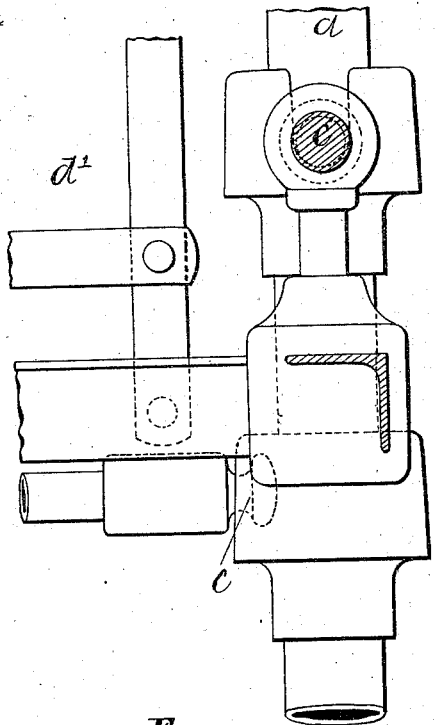
Figure 22:
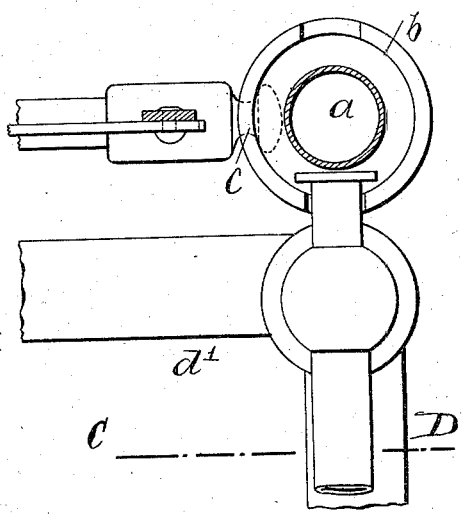

Figure 1 of the accompanying drawings represents in side elevation a two-high block of berths constructed and mounted according to my invention. Fig. 2 represents a like block of berths as Fig. 1, but with the stanchions arranged in different position. Fig. 3 is a diagrammatic view of a block of berths inclosed or partially inclosed by parting-boards. Fig. 4 represents, partly in elevation and partly in vertical section, a block of three-high and two-broad berths. Fig. 5 represents a plan of cabin inclosed berths. Fig. 6 represents, upon an enlarged scale, a connection end of one of the block-berths, Fig. 1. Fig. 7 represents a view of a slotted bearing-bracket. Fig. 8 is a plan view of the same. Fig. 9 is a view of a parting-board with its fittings. Fig. 10 is an end view of a parting-board with modified connections. Fig. 11 is a plan view of a modified form of socketed and slotted bracket for the berth-framing and parting-boards. Fig. 12 is an elevation of Fig. 11. Fig. 13 represents a modified form of connection. Fig. 14 is a horizontal section on dotted lines A B of Fig. 13. Fig. 15 represents another arrangement of parting-off boards. Fig. 16 is a plan view of the berth-inclosing parting-boards arranged as cabins in blocks. Fig. 17 is a representation of berths arranged in blocks with the berth-parting boards fitted with guide-shoes. Fig. 18 is a plan view, partly in section, of parts shown in Fig. 17. Fig. 19 is a view of the combined half-lee rails shown in Fig. 4. Fig. 20 is a detailed part of the said combined half-lee rails. Fig. 21 is a view representing my invention in connection with block-berths having turned-up bottoms. Figs. 22 and 23 are detail views.

In the block of berths, Fig. 1, and the detail views, Figs. 6, 7, and 8, $a$ are fitted stanchions or pillars, secured between decks by the top and bottom ends of them taking into sockets. $b$ are cupped and slotted bearing-brackets consisting of a body part $b'$, an inside cupped part $b^2$, and vertical slots $b^3$, within which latter the spherical or bulbous ends $c$ of the sides $d'$ of the berths take and are there supported, and are capable of turning jointwise within the sockets of the cups, in order to follow the rake of a ship or any inequalities in the decks. The side framings $d'$ are composed of longitudinal rails $d^2$ and of upright rails $d^3$, with the same united together by loosely-riveted pins $d^4$, so as to admit of the said outside framings following the rake of a ship or any inequalities in the slope of the decks. Thus the members constituting the sides are jointed to each other, and are capable thereby of making a slight angle should the same be required, while the bulbous ends of the connections also turn jointwise within the sockets.

From the above description it will be observed that the blocks of berths admit of covering any area and following any variations of deck, and that the sides, which are complete in themselves, are detachable, and in the connection of the same the spherical-headed ends have only to be dropped into the slots of the sockets, when they immediately right themselves to the deck of the ship. The sacking bottoms of the berths are also dropped into position and supported by the side framings. The whole, including the stanchions, is thus made portable for removal or erection. By employing detachable and attachable fittings between deck space can be used either for passenger accommodation or for the stowing of cargo. If necessary, the brackets $b$ may be made adjustable upon the pillars, so as to regulate relatively the heights of the berths.

In Fig. 2 the supporting-brackets $b$ are arranged at such distances apart up the stanchions $a$ that the berths $d$ admit of being placed at greater or less distances apart, according to the number of passengers required to be accommodated. The left-hand-side tier of berths represents three high, while the right-hand side of berths show only two high. Thus for a three-high tier the upper, lower, and middle brackets are employed, but for a two-high tier the intermediate brackets between the high, low, and middle brackets are employed.

In the diagrammatic view, Fig. 3, the blocks of berths, as in Fig. 1, are shown surrounded by parting-off or divisional boards supported by stanchions and brackets in manner alike unto the berth-framings. $d$ are berths having connections $c$, supported by stanchions $a$ and brackets $b$. $e$ are parting-off or divisional boards hung from connections $c$, resting upon the slotted and socket-supporting brackets $b$ of the pillars $a$, alike unto the berth, Fig. 1. Ingress and egress to or from the inclosure or berth is made by a door or doors $e'$.

Fig. 4 represents a further modified form of block-berth with the parting-off or divisional boards $e$ made up in segments and with the same hung from brackets $b$ by bulbous or hook-shaped connections $c$, carried by shoe attachments $e^2$ of the said parting-off or division boards. (See on an enlarged scale at Fig. 9.)

Fig. 5 represents a plan of Fig. 4, showing the positions of the berths relative to the parting-off or divisional boards. One side of the block is shown inclosed and access gained by a door, while the other side is inclosed by a curtain. The berths are provided with half-lee rails or lee sides, (see the enlarged views, Figs. 19 and 20,) instead of full-length ones, as in the preceding arrangement, Fig. 1. Thus in Figs. 4, 5, 9, 19, and 20 $a$ are the stanchions fitted between decks by the ends taking within sockets $a'$. $b$ are slotted and socketed bearing-brackets, from which the parting-off boards $e$, fitted with shoes $e^2$ at their upper and lower end corners and having bulbous-ended or hook-shaped connections $c$, are hung. The half-lee rails of the berths $d$, which are combined together in a triptic form, are each composed of members $d^2$ $d^3$, jointed at $d^4$. The upper rails of the members $d^2$ of the said sides have their ends $d^5$ taking within flared sockets $d^6$, so as to admit of the rails following the rake of a ship or any inequalities in the decks or in the fittings of the berths. In Fig. 5 the curtain inclosing one of the sides is marked $f$.

In Fig. 10, $e$ is a parting-off board, either for passenger accommodation or for a parting-board for forming pockets for grain-carrying ships when no passengers are being carried. $c$ is the bulbous end, and $e^2$ the connection or shoe.

In Figs. 11 and 12, $b$ is a bracket. $d^2$ are rails of framings $d'$, having bulbous-ended connections $c$ taking into the socketed and slotted sides $b^2$ $b^3$. This bracket is intended for the support of divisional boards or parting-rails, which are to be arranged at right angles to one another.

In Figs. 13 and 14, $a$ is a stanchion. $b$ is a bracket carrying headed studs $c$, over which an inverted socket $b^2$ of the berth-framing $d'$ takes. This construction is an inversion of, but intended to serve the same purpose as, the slotted bracket and bulbous coupling members shown in the other figures of the drawings.

In Figs. 15 and 16, $a$ are stanchions, and $a'$ sockets wherein the ends of the same are fitted. $b$ are cupped and socketed bearing-brackets from which the partition or parting-off boards $e$ are hung by bulbous-headed or hook-shaped connections $c$, carried by shoes $e^2$ of them. The parting-off boards are made in the form of cabin sides or walls, and the berths are incased or inclosed in the compartments formed by said parting-off boards, and when the parting-off boards are employed the berths may be provided with bulbous-ended coupling members, which take into sockets $e^3$, formed in the shoes $e^2$, as shown in Figs. 17 and 18.

In Figs. 17 and 18, $a$ are the stanchions. $b$ are the socketed and slotted bearing-brackets. $c$ are bulbous-ended hooks or connections of shoes $e^2$, connected to the parting, parting-off, or partition boards $e$. $e^3$ are pocket-recesses within the said shoes, wherein bulbous or hook ended connections $c$, carried by the berth-framings $d$, drop and are there supported. The middle parting-boards of the berth in this arrangement are slid into slides $g$, carried by the side parting-boards.

In Figs. 21, 22, and 23, which show folding berths having my improvements applied thereto, $a$ are the stanchions. $b$ are the supporting-brackets. $d'$ are the attachable and detachable jointed berth sides. $d$ is a turn-up berth, and $c$ are the bulbous and enlarged ends engaging with the said brackets.

Having fully described my invention, what I desire to claim and secure by Letters Patent is—

1. In between deck fittings, the combination with a berth and upright supports, of coupling members, one a socket, the other a bulbous head fitting in said socket, said members being attached respectively to the framing and berth, substantially as described.

2. In between deck fittings of ships, the combination with boundary and parting rails comprising horizontal and vertical members pivotally secured together, of upright standards, sockets carried by said standards, and coupling members on said parting rails fitting in said sockets, substantially as described.

3. In between deck fittings of ships, the combination with upright standards and socketed bearings carried thereby, of shoes secured to parting off or divisional boards and formed with bulbous heads adapted to enter said socketed members, substantially as described.

4. In between deck fittings of ships, the combination with upright standards and socketed bearing brackets carried by said standards, of shoes formed with bulbous heads fitting said socketed bearings and with bulbous headed members on the berths, fitting sockets in said shoes, substantially as described.

In testimony that I claim the foregoing I have hereunto set my hand this 2d day of November, 1892.

WILLIAM PARISH HOSKINS.

Witnesses:
HENRY SKERRETT,
ARTHUR T. SADLER.